United States Patent

Danloup

[11] Patent Number: 5,457,504
[45] Date of Patent: Oct. 10, 1995

[54] EYEGLASS FRAME

[75] Inventor: André Danloup, Champigny sur Marne, France

[73] Assignee: Essilor International, Compagnie Generale d'Optique, Charenton le Pont, France

[21] Appl. No.: 303,153

[22] Filed: Sep. 8, 1994

[30] Foreign Application Priority Data

Sep. 9, 1993 [FR] France .................................. 93 10722

[51] Int. Cl.$^6$ ...................................... G02C 1/04
[52] U.S. Cl. ........................... 351/106; 351/103; 351/149
[58] Field of Search ............................. 351/65, 103, 104, 351/105, 106, 107, 108, 109, 110, 140, 142, 149

[56] References Cited

U.S. PATENT DOCUMENTS

| | | | |
|---|---|---|---|
| 2,516,549 | 7/1950 | Chappell | 351/103 |
| 4,371,238 | 2/1983 | Lhospice | 351/106 |
| 4,432,616 | 2/1984 | Kurosaka | 351/186 |
| 4,466,713 | 8/1984 | Tanaka | 351/106 |
| 4,842,399 | 6/1989 | Tsai | 351/106 |

FOREIGN PATENT DOCUMENTS

| | | |
|---|---|---|
| 0027415 | 4/1981 | European Pat. Off. . |
| 2360900 | 3/1978 | France . |
| 2504694 | 10/1982 | France . |
| 2489970 | 3/1988 | France . |
| 3718794 | 12/1988 | Germany . |
| 1568147 | 5/1980 | United Kingdom . |

OTHER PUBLICATIONS

Patent Abstracts of Japan vol. 5, No. 5 (P–044) Jan. 14, 1981 & JP–A–55 135 814—Seiko Epson Corp.—Oct. 23, 1980.

Primary Examiner—William L. Sikes
Assistant Examiner—David R. Parsons
Attorney, Agent, or Firm—Young & Thompson

[57] ABSTRACT

In an eyeglass frame each lens is gripped between a relatively rigid half-rim and a filament. The half-rim is fixed to a tenon in which is formed a cavity opening through an orifice forming a keyhole slot. The filament includes a knot retained in the cavity by the keyhole slot.

4 Claims, 1 Drawing Sheet

EYEGLASS FRAME

BACKGROUND OF THE INVENTION

1. Field of the invention

The invention concerns an eyeglass frame including, for holding each lens, a half-rim which is relatively rigid and a filament stretched between its ends. The invention is more particularly concerned with an improvement relating to attachment of the filament to the half-rim.

2. Description of the Prior Art

In one type of prior art eyeglass frame the rigid part comprises only two half-rims, either at the top or at the bottom, joined to opposite sides of the bridge and to which respective hinged side members of the frame are attached. The side members are connected to the outer ends of the half-rims by tenons which are usually part of the respective hinge. Each half-rim has a filament made from nylon, for example, or a similar synthetic material attached to its ends. Each lens is matched to the inside contour of the half-rim, in which it nests, and includes over the complementary part of its perimeter a fine groove in which said filament is accommodated under tension.

In a frame of this kind the filament can be immobilized by a wedging action between two nearby holes formed at one end of the half-rim. An assembly of this kind is difficult to adjust. Patent FR-A-2 489 970 describes another assembly in which an enlarged end of the filament is housed and immobilized in a cavity of appropriate shape formed at the end of the half-rim, which must therefore be relatively massive for the cavity to be formed in it. The shape of the cavity is relatively complicated.

Moreover, turning to the esthetic aspect, a frame of this kind is often more elegant, other things being equal, if the rigid part comprising the bridge and the half-rims is particularly thin. Attaching the filaments to the ends of the half-rims then raises particular problems.

A first object of the invention is to propose a new method of fixing the filament which is compatible with an eyeglass frame of the type specified above and which includes a particularly thin rigid part (bridge+half-rims).

Another object of the invention is to propose a method of fixing the end of the filament which does not require any additional or specific component of the rigid part (bridge+half-rims).

SUMMARY OF THE INVENTION

The invention consists in an eyeglass frame including, for holding each lens, a relatively rigid half-rim, a filament joined to the ends of said half-rim, one end being additionally fixed to a tenon for attaching a side member of the frame, a cavity formed in said tenon, open towards the interior of said half-rim through an orifice forming a keyhole slot, and an enlargement at one end of the filament inserted in said cavity and retained therein by said keyhole slot.

In a currently preferred embodiment of the invention the cavity is a blind hole formed in the tenon and the end of the half-rim is fixed to the tenon in such a way as to cover the hole. The orifice forming a keyhole slot is defined by a cut-out of corresponding shape in the end of the half-rim. The half-rim is preferably made of metal. It can have a curved transverse cross-section, for example, adapted to receive the edge of the lens. As previously mentioned, the enlargement can simply be a knot in the filament.

By "keyhole slot" is meant an opening that is entirely conventional in the mechanical engineering art and comprises, from one side to the other, a relatively wider insertion part into which said enlargement of the filament can be inserted and a relatively narrower part against which said enlargement is immobilized.

The invention will be better understood and other advantages of the invention will emerge more clearly from the following description of an eyeglass frame in accordance with the invention given by way of example only and with reference to the appended drawings.

DETAILED DESCRIPTION OF THE PREFERRED EMBODIMENT

Figure 1:
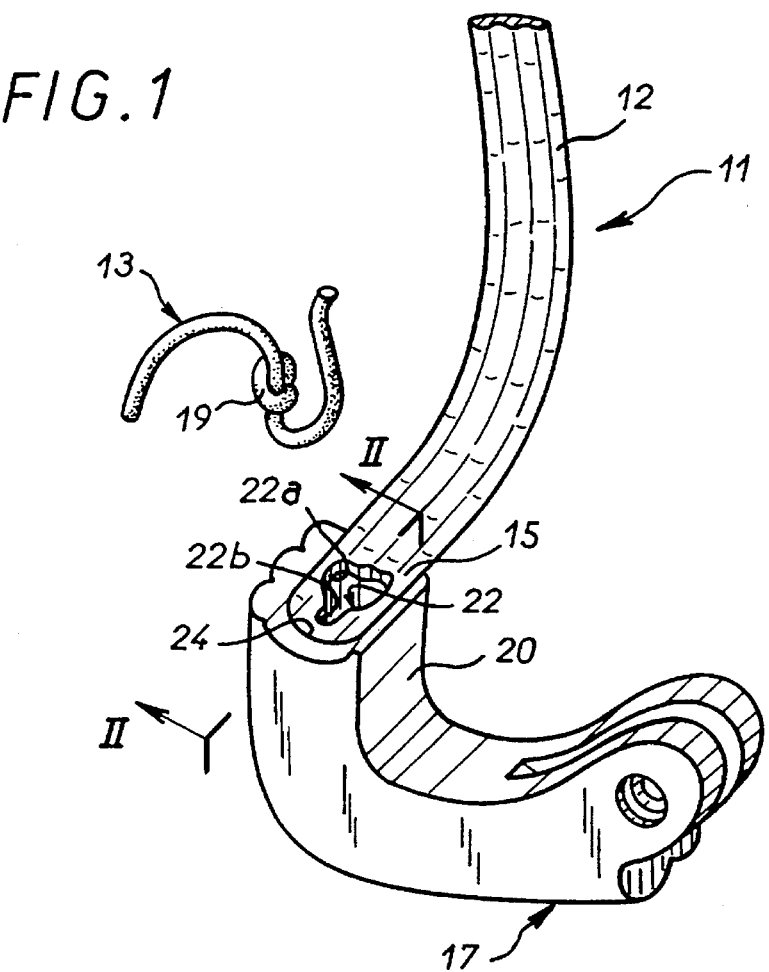
FIG. 1 is a partial perspective view of an eyeglass frame in accordance with the invention.

The drawings show part of an eyeglass frame comprising a metal rigid part 11 essentially constituted of two half-rims 12 connected to opposite sides of a bridge (not visible in the drawings). Each half-rim has a curved transverse cross-section shaped to grip the edge of a lens, which is not shown in order to avoid over-complicating the drawing. Each half-rim 12 is associated with a filament 13 connected to its free ends. At the end of the half-rim adjoining the bridge the filament is attached in the conventional way. For example, it is immobilized by a wedging action between two nearby holes formed in the half-rim near this end. The outer end part 15 of the half-rim 12 is fixed to a tenon 17 which forms a hinge member for a side member of the frame. In this example the rigid part 11 and the tenons 17 are made of metal, the end part of the half-rim being welded to an end 20 of the tenon. At a predetermined location the filament has an enlargement which in this example is formed by tying a knot 19 in the filament.

Figure 2:
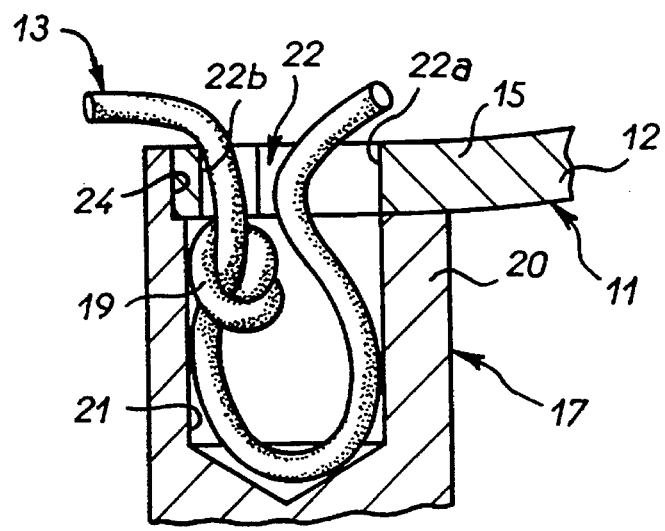
FIG. 2 is a view in cross-section on the line II—II in FIG. 1.

According to an important feature of the invention a cavity 21 is formed at the end 20 of the tenon. It is open towards the inside of the half-rim 12 through an orifice 22 forming a keyhole slot. The enlargement of the filament, i.e. the knot 19 in this example, is inserted in the cavity 21 and retained therein by the keyhole slot. To be more precise, said keyhole slot conventionally comprises a relatively wider part 22a, i.e. an opening large enough to enable insertion of the knot 19 into the cavity, and a relatively narrower part 22b adjoining the relatively wider part through which the filament 13 passes but which retains the knot 19 in the cavity 21. In this example the latter is blind hole (FIG. 2) formed in the tenon 20 and the end part 15 of the half-rim is fixed to the tenon 17 to cover the blind hole. The orifice forming the keyhole slot is defined by a cut-out of appropriate shape in the end part 15 of the half-rim, covering the orifice of the blind hole. In the example shown the tenon 17 includes a shoulder 24 against which the end of the half-rim bears when it is welded on. This assembly enables accurate positioning of the keyhole slot facing the orifice of the blind hole formed in the tenon.

To assemble the eyeglasses, the filament is first attached to the end of the half-rim near the bridge. The filament is then knotted so that the knot 19 is at a predetermined distance from the first fixing. This distance naturally depends on the shape and size of the lens to be held between the half-rim and the filament. The end part of the filament, beyond the knot, is then folded back parallel to the run of filament of predetermined length and the knot is inserted into the cavity 21 and immobilized in the latter against the inside surface of the relatively narrower part 22b of the keyhole slot. The end of the filament then emerges from the cavity through the wider part 22a of the orifice forming the keyhole slot. It is cut off a few millimeters from this orifice before the lens is fitted. The lens completely covers the end of the filament which, as clearly seen in FIG. 2, facilitates extraction of the filament should the latter break.

There is claimed:

1. Eyeglass frame including, for holding each lens, a relatively rigid half-rim, a filament joined to the ends of said half-rim, one end being additionally fixed to a tenon for attaching a hinged side member of said frame, a cavity formed in said tenon, open towards the interior of said half-rim through an orifice forming a keyhole slot, and an enlargement at one end of said filament inserted in said cavity and retained therein by said keyhole slot.

2. Eyeglass frame according to claim 1 wherein said cavity is a blind hole in said tenon, the end part of said half-rim is fixed to said tenon in such a way as to cover said blind hole and said orifice forming said keyhole slot is defined by a cut-out of corresponding shape in said end part of said half-rim.

3. Eyeglass frame according to claim 1 wherein said enlargement is a knot in said filament.

4. Eyeglass frame according to claim 1 wherein the end of said filament emerges from said cavity through a wider part of said orifice forming said keyhole slot, to facilitate extraction of said filament.

* * * * *